United States Patent
Kohmura et al.

(10) Patent No.: US 6,578,414 B2
(45) Date of Patent: Jun. 17, 2003

(54) SPLIT-FLOW-TYPE FLOWMETER

(75) Inventors: Yoshihiko Kohmura, Aichi (JP); Shunsuke Maeda, Aichi (JP); Takio Kojima, Aichi (JP); Takafumi Oshima, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/925,404

(22) Filed: Aug. 10, 2001

(65) Prior Publication Data
US 2002/0023485 A1 Feb. 28, 2002

(30) Foreign Application Priority Data

Aug. 11, 2000 (JP) ........................ 2000-245073
Aug. 31, 2000 (JP) ........................ 2000-263687

(51) Int. Cl.[7] ............................ G01F 5/00; G01M 19/00
(52) U.S. Cl. ............................ 73/202; 73/118.2
(58) Field of Search ................ 73/202, 202.5, 73/118.2, 204.22

(56) References Cited

U.S. PATENT DOCUMENTS

| | | | | |
|---|---|---|---|---|
| 4,395,907 A | * | 8/1983 | Morita et al. ............... | 73/118.2 |
| 5,789,673 A | | 8/1998 | Igarashi et al. | |
| 5,804,718 A | * | 9/1998 | Nagasaka et al. .......... | 73/118.2 |
| 5,939,628 A | | 8/1999 | Igarashi et al. | |
| 5,948,975 A | | 9/1999 | Mueller et al. | |
| 5,965,813 A | * | 10/1999 | Wan et al. ............... | 73/204.15 |
| 6,189,379 B1 | | 2/2001 | Igarashi et al. | |
| 6,223,594 B1 | | 5/2001 | Takiguchi et al. | |

FOREIGN PATENT DOCUMENTS

| | | |
|---|---|---|
| JP | 8-5427 | 1/1996 |
| JP | 11-132817 | 5/1999 |

\* cited by examiner

*Primary Examiner*—Hezron Williams
*Assistant Examiner*—Takisha S Miller
(74) *Attorney, Agent, or Firm*—Sughrue Mion, PLLC

(57) ABSTRACT

A split-flow-type flowmeter in which an end portion of a flow splitter tube 1 is inserted into a main-flow pipe 10 having a diameter D. A flow splitter tube 1 includes a U-shaped split-flow passage 1a. A detection element is disposed at a bottom portion (not shown) of the U-shaped split-flow passage 1a. The split-flow passage 1a assumes a flow path structure symmetrical with respect to a plane passing through the detection element. A flow inlet 2a and a flow outlet 2b of the split-flow passage 1a face in mutually opposite directions along the flow direction of the main-flow pipe 10 and open symmetrically at the same position on the flow cross section of the main-flow pipe 10. In order to divert into the split-flow passage 1a a portion of relatively high flow rate of flow from the main-flow pipe 10, the center of opening of the flow inlet 2a/flow outlet 2b is positioned between the center of the flow cross section of the main-flow pipe 10 and an average-flow-velocity position at which flow in the main-flow pipe 10 is of an average flow velocity, as observed on the flow cross section of the main-flow pipe 10.

18 Claims, 12 Drawing Sheets

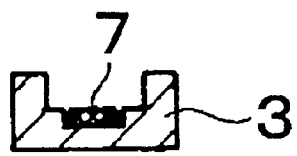
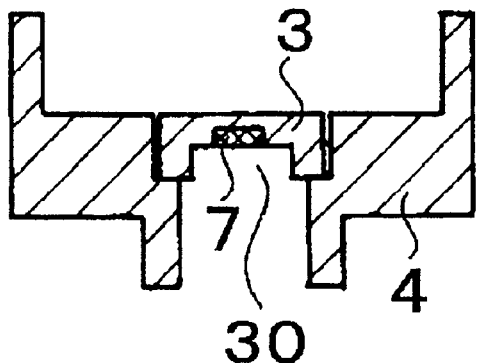
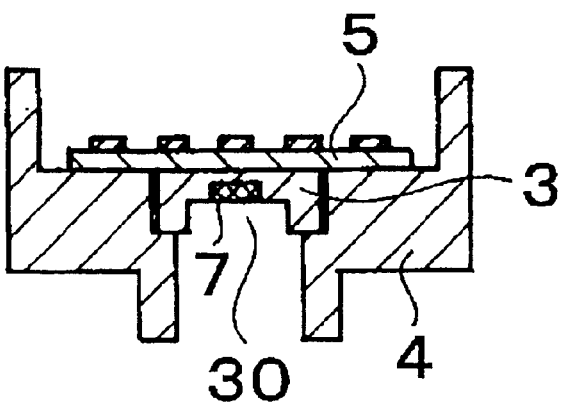
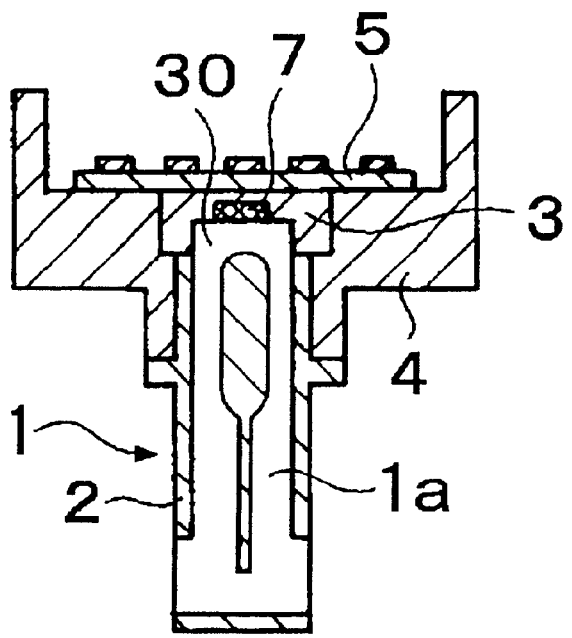

2   3

2   3

2   3

2   3

2   3

2   3

TWO-CYLINDER ENGINE

FOUR-CYLINDER ENGINE

SPLIT-FLOW-TYPE FLOWMETER

BACKGROUND OF THE INVENTION

1. Field of the Invention

The present invention relates to a split-flow-type flowmeter for measuring parameters related to flow, particularly flow rate and flow velocity. More particularly, the invention relates to a split-flow-type flowmeter using a temperature-dependent detection element and/or a detection element integrally formed on a semiconductor chip; for example, a split-flow-type flowmeter favorably applicable to a mass flow sensor for use in combustion control of a vehicle or an industrial engine, a mass flow sensor for use in an industrial air-conditioning system or a compressed-air supply system, or a flow sensor for use in control of the air-fuel ratio of a household gas cooker.

2. Description of the Related Art

Japanese Patent Application Laid-Open (kokai) No. 8-5427 discloses a split-flow-type flowmeter to be attached to an intake system of an internal combustion engine. In order to accurately measure flow rate in a main-flow pipe along the regular flow direction (directed from an air intake toward the internal combustion engine), the disclosed split-flow-type flowmeter is designed such that the structure of a split-flow passage, the position of a flow inlet of the passage, and the position of a flow outlet of the passage are determined so as to avoid influence of a pulsating flow; i.e., so as not to detect a pulsation component.

Specifically, the split-flow-type flowmeter disclosed in Japanese Patent Application Laid-Open (kokai) No. 8-5427 is characterized in the following:

(1) The center of an opening of the flow inlet of a flow splitter tube is located at a position on a flow cross section of the main-flow pipe where flow is theoretically of an average flow velocity, for the following reason. When the flow inlet is located at a position where the flow velocity is higher than the average flow velocity (at a position biased toward the center of the main-flow pipe), a measurement error on the plus side arises. By contrast, when the flow inlet is located at a position where a flow velocity is lower (at a position biased toward the wall surface of the main-flow pipe), a measurement error on the minus side arises.

(2) The split-flow passage assumes the shape of the letter L such that a downstream flow path extending on a flow cross section of the main-flow pipe is longer than an upstream flow path extending in parallel with the flow direction in the main-flow pipe, thereby yielding an inertial effect. The inertial effect cancels a measurement error on the minus side which arises from delay in detection response upon occurrence of a pulsating flow in the main-flow pipe.

(3) The flow inlet of the split-flow passage opens on a surface (flow cross section) facing toward a direction opposite the flow direction in the main-flow pipe. The flow outlet of the split-flow passage opens on a surface parallel to the flow direction in the main-flow pipe. Thus, pressure at the flow inlet is always higher than that at the flow outlet, thereby preventing backflow from the flow outlet.

(4) A heating resistor and a temperature-sensing resistor, which constitute a hot-wire flowmeter, are disposed apart from each other in the split-flow passage.

(5) The heating resistor and the temperature-sensing resistor are located within the main-flow pipe.

The split-flow-type flowmeter disclosed in Japanese Patent Application Laid-Open (kokai) No. 8-5427 can measure a flow rate accurately when a flow direction or flow rate remains unchanged for a relatively long period of time; i.e., the flowmeter can measure an average flow rate over a long period of time. However, the split-flow-type flowmeter cannot measure the flow rate of a varying flow with good response. This is because the split-flow-type flowmeter is designed such that the structure of the split-flow passage, the position of the flow inlet of the passage, and the position of the flow outlet of the passage are determined so as not to detect pulsation.

SUMMARY OF THE INVENTION

In view of the foregoing, a primary object of the present invention is to provide a split-flow-type flowmeter capable of measuring the flow rate of a pulsating flow. Another object of the present invention is to provide a construction of a split-flow-type flowmeter facilitating achievement of the primary object of the invention. A further object of the present invention is to provide a split-flow-type flowmeter allowing easy optimization of the position of a flow inlet/flow outlet of a flow splitter tube according to the diameter of a main-flow pipe and capable of measuring a flow rate accurately.

To achieve the primary object mentioned above, the present invention provides a split-flow-type flowmeter characterized in that a split-flow passage assumes a flow path structure that is symmetrical with respect to a plane passing through a detection element or with respect to the detection element; a flow inlet and a flow outlet of the split-flow passage open in opposition to each other along a flow direction in a main-flow pipe and are symmetrically positioned with respect to a flow cross section of the main-flow pipe; in order to divert into the split-flow passage a portion of flow having a relatively high flow velocity from the main-flow pipe, the center of opening of the flow inlet/flow outlet of the split-flow passage is positioned between the center of the flow cross section of the main-flow pipe and an average-flow-velocity position at which flow in the main-flow pipe is of an average flow velocity, as observed on the flow cross section of the main-flow pipe.

The split-flow-type flowmeter of the present invention provides the following advantages.

(1) Since the flow inlet and the flow outlet are structured and arranged symmetrically and the split-flow passage assumes the form of a flow path that is symmetrical with respect to the detection element, a regular flow component and a backflow component can be detected with equivalent response.

(2) Since the flow inlet and the flow outlet of the split flow passage open into the main-flow pipe at a position of high flow velocity, the flowmeter can capture a pulsating flow, an abrupt change in flow direction in the main-flow pipe, and abrupt variations in flow rate. Thus, the flow rate can be measured with good response.

(3) Thus, the split-flow-type flowmeter of the present invention can be favorably applied to measurement of a flow rate in the main-flow pipe in which flow may pulsate.

(4) Furthermore, the split-flow-type flowmeter of the present invention can measure, with equivalent response, a regular flow component and a backflow component of a pulsating flow in the main-flow pipe.

The present invention further provides the following constructions of the split-flow-type flowmeter mentioned above. Specifically, the present invention provides a construction of a split-flow-type flowmeter comprising an introduction unit for diverting therein a portion of flow from the main-flow pipe, and a detection unit having a detection element and a flow path peripheral to the detection element and in which, with the introduction unit and the detection unit attached to the main-flow pipe, flow paths belonging to the respective units communicate with each other directly or indirectly to thereby establish the split-flow passage. The present invention further provides a construction of a split-flow-type flowmeter comprising an introduction unit inserted into the main-flow pipe and having a flow inlet for diverting therein a portion of flow from the main-flow pipe, a flow outlet for discharging the portion of flow, and a first flow path communicating with the flow inlet and the flow outlet that is symmetrical with respect to a predetermined plane; and a detection unit having a second flow path that is symmetrical with respect to a predetermined plane and a detection element exposed to flow within the second flow path. Herein, the term "a predetermined plane" means a plane parallel to a flow cross section of the main-flow pipe as observed in an assembled condition. That is, the first flow path and the second flow path each is symmetrical with respect to a predetermined plane that is parallel to a flow cross section of the main-flow pipe such that a portion of the first/second flow path that is located upstream of the plane with respect to the direction of main flow in the main-flow pipe (with respect to the axis of the main-flow pipe) is symmetrical to a portion of the first/second flow path that is located downstream of the plane with respect to the direction of main flow in the main-flow pipe. The present invention further provides a construction of a split-flow-type flowmeter adapted to attach the introduction unit and the detection unit directly or indirectly to the main-flow pipe via a mounting main-body unit. The present invention further provides a construction of a split-flow-type flowmeter comprising a plurality of units each having a flow path and adapted to attach the plurality of units directly or indirectly to the main-flow pipe to thereby establish communication among the flow paths and thus establish a split-flow passage.

The construction for the split-flow-type flowmeter of the present invention allows selection of an introduction unit whose length corresponds to the diameter of the main-flow pipe such that the flow inlet of the split-flow passage is positioned at a central portion of a flow cross section of the main-flow pipe. Since the detection element and the flow path peripheral to the detection element belong to the same unit; i.e., since the relative position between the detection element and the peripheral flow path is fixed, even when a displacement arises between the introduction unit and the detection unit during assembling work, influence of the displacement on measurement is lessened. Thus, the present invention provides a split-flow-type flowmeter applicable to a main-flow pipe of arbitrary diameter while having a common basic structure, and capable of measuring a flow rate at high accuracy. The present invention also provides a split-flow-type flowmeter which can be adapted not only to the diameter of the main-flow pipe but also to conditions in the vicinity of a measurement position, such as presence of a throttle valve or a bend portion of the main-flow pipe.

First will be described the reason for positioning the center of opening of the flow inlet/flow outlet of the split-flow passage between the center of the flow cross section of the main-flow pipe and a position (hereinafter called the average-flow-velocity position) at which flow in the main-flow pipe is of an average flow velocity, as observed on the flow cross section of the main-flow pipe.

It is self-evident that the flow rate of a near steady-state flow without pulsation can be measured at the average-flow-velocity position. In this case, there is sufficient reason to eliminate the influence of slight pulsation in measurement.

However, the method mentioned above encounters difficulty in measuring an air flow rate accurately when the air flow is in a transient state and involves pulsation including backflow.

A different concept of measurement must be employed; i.e., measuring means capable of capturing a transient state called pulsation must be employed.

In the case of an air flow in the steady state, the flow velocity is the highest at the center of the main-flow pipe and lowers as the point of measurement approaches the pipe wall surface. In the case of an air flow in a transient state, flow is not sufficiently developed in the vicinity of the pipe wall surface due to friction against the pipe wall surface; thus, the difference between a flow velocity at the pipe center and that in the vicinity of the pipe wall surface becomes large as compared with the case of an air flow in the steady state. Also, since flow in the vicinity of the pipe wall surface varies moment by moment due to influence of friction, the flow velocity is unstable.

Accordingly, in the case of air flow involving pulsation, the air flow rate can be measured accurately by measuring at the pipe center, where the air flow develops quickly.

Thus, according to the present invention, in order to divert into the split-flow passage a portion of flow having a relatively high flow velocity from the main-flow pipe, the center of opening of the flow inlet/flow outlet of the split-flow passage is positioned between the center of the flow cross section of the main-flow pipe and the average-flow-velocity position, as observed on the flow cross section of the main-flow pipe. As a result, the state of flow in the main-flow pipe can be captured with good response.

Because of enhanced response capability as mentioned above, the split-flow-type flowmeter of the present invention can measure the flow rate of a pulsating flow, particularly the flow rate of a significantly pulsating flow involving backflow. Accordingly, the split-flow-type flowmeter of the present invention can be favorably used to measure a flow rate in applications involving pulsation; for example, to measure a flow rate for an intake pipe of an internal combustion engine.

A change in flow in an intake pipe with the rotational speed of an internal combustion engine will be schematically described. Referring to FIGS. 13(A) and 13(B) of the accompanying drawings, flow in the intake pipe involves pulsation all the time during transition of the rotational speed of the internal combustion engine from low speed to high speed. During low-speed rotation; i.e., when the time-average air flow rate (represented by the dashed line in FIG. 13(A)) in the intake pipe is low, backflow is generated. During high-speed rotation; i.e., when the time-average air flow rate in the intake pipe is high, pulsation is generated, but backflow is unlikely to be generated.

Next will be described the relationship between the strokes of a 4-cycle internal combustion engine mounted on a vehicle and a detection output of a split-flow-type flowmeter of the present invention in the case where the split-flow-type flowmeter is used to measure a flow rate in an intake pipe of the engine. For comparison, there will be schematically described the relationship between the strokes of a 4-cycle internal combustion engine mounted on a vehicle and a detection output of a conventional split-flow-type flowmeter having a structure to eliminate pulsation and incapable of detecting backflow, such as the aforementioned flowmeter disclosed in Japanese Patent Application Laid-Open (kokai) No. 8-5427, in the case where the split-flow-type flowmeter is used to measure a flow rate in an intake pipe of the engine.

Referring to FIG. 14(A), the split-flow-type flowmeter of the present invention can capture an abrupt rise in flow rate at the initial stage of the intake stroke. When backflow is generated in a period ranging from the last stage of the intake stroke to the initial stage of the compression stroke, the split-flow-type flowmeter of the present invention captures a flow rate on the minus side and issues a minus detection output.

Referring to FIG. 14(B), the split-flow-type flowmeter according to Comparative Example shows slow response in issuing a detection output corresponding to an abrupt increase in flow rate at the initial stage of the intake stroke because of structure to eliminate pulsation. When backflow is generated in a period ranging from the last stage of the intake stroke to the initial stage of the compression stroke, the split-flow-type flowmeter according to the Comparative Example issues a detection output involving a measurement error on the plus side, since the flowmeter cannot identify a flow rate on the minus side characteristically and structurally.

Particularly, the split-flow-type flowmeter of the present invention is favorably employed to measure a flow rate in an intake pipe of an internal combustion engine to be mounted on a two-wheeled vehicle (i.e., motorcycle) or a compact four-wheeled vehicle (i.e., compact car). This is because the intake pipe of an internal combustion engine for use in a two-wheeled vehicle or a compact four-wheeled vehicle is short and involves great fluctuations in flow therein.

As shown in FIG. 15(A), in the case of a two-wheeled vehicle, even when the engine speed is constant, pulsation and even backflow are generated in an intake pipe for the structural reason of the intake system and engine (see the left-hand drawing in FIG. 15(A)); hence, the flow velocity distribution in the intake pipe fluctuates all the time, resulting in significant variations in flow rate in the intake pipe.

As shown in FIG. 15(B), in the case of a four-wheeled vehicle (particularly of medium or large size), when the engine speed is constant, flow in an intake pipe is relatively stable for the structural reason of the intake system and engine (see the left-hand drawing in FIG. 15(B)).

For accurate measurement of the flow rate of a pulsating flow and the flow rate of backflow, a hot-wire flowmeter of quick response employing a detection element formed integrally on a semiconductor substrate of small heat capacity, which will be described later, is preferred.

Preferred, i.e., optional, aspects of the present invention will next be described.

According to a preferred aspect of the present invention, the position of the flow inlet and the flow outlet of the split-flow passage is determined so as to divert into the split-flow passage a portion of flow having a relatively high flow velocity from the main-flow pipe. Preferably, the center of opening of the flow inlet/flow outlet of the split-flow passage is positioned within the radius (a radius on a flow cross section of the main-flow pipe) 5D/16 (particularly within a circular area of a radius 5D/16) from the center of the flow cross section of the main-flow pipe (hereinafter is also called "the center of the main-flow pipe"), where D is the diameter of the flow cross section of the main-flow pipe. More preferably, the center of opening of the flow inlet/flow outlet is positioned within a radius D/4 from the center of the main-flow pipe.

Steady State

Generally, it is said that when a flow within a pipe is in the steady state, a portion of the flow having an average flow velocity is located 8–15% the pipe diameter D away from the inner wall surface of a pipe; i.e., 0.35D-0.42D away from the pipe center (refer to "Reissued Handbook of Visualization of Flow," Chapter 1 "Basics of Visualization of Flow," 1.2.3 "Laminar Flow and Turbulent Flow," (1) Averages of Momentum, etc., Edited by The Visualization Society of Japan, Published by Asakura Shoten, 6th Issue, Jun. 15, 1995; and "Mechanical Engineering Handbook—Basics," Chapter II "Flow in Flow Path," Written and Published by The Japan Society of Mechanical Engineers, 8th Issue, Nov. 28, 1997).

Transient State

In the transient state, air flow is developed slowly in the vicinity of the pipe wall surface due to friction and is developed quickly at a central portion of the pipe. Thus, when, as mentioned above, the center of opening of the flow inlet/flow outlet of the split-flow passage is positioned within a radius 5D/16 from the center of the main-flow pipe, flow of sufficiently high velocity can be diverted into the split-flow passage.

A split-flow-type flowmeter according to a preferred aspect of the present invention is such that L is not greater than D/2, where D is the diameter of the flow cross section of the main-flow pipe and L is the width of opening of the flow inlet/flow outlet of the split-flow passage. Preferably, L is not greater than D/4. Thus, flows of different flow velocities distributed on the flow cross section of the main-flow pipe can be diverted into the split-flow passage, whereby the current state of flow can be captured accurately.

A split-flow-type flowmeter according to a preferred aspect of the present invention is such that a bypass flow path connecting straight the flow inlet and the flow outlet and bypassing the split-flow passage extending on the detection element is formed. Thus, diversion of flow into the split-flow passage extending on the detection element is facilitated and contaminant (particles) flows through the bypass flow path.

A split-flow-type flowmeter according to a preferred aspect of the present invention is such that a portion of the split-flow passage decreases gradually in cross-sectional diameter from the flow inlet toward the detection element and from the flow outlet toward the detection element. Thus, diversion of flow into the split-flow passage extending on the detection element is facilitated.

A split-flow-type flowmeter according to a preferred aspect of the present invention is such that the detection element is disposed on a bottom portion of the split-flow passage and such that the detection element and a flow path extending in the vicinity of inflection portions located before and after the detection element belong to the same unit. Thus, even when the introduction unit is replaced, detection characteristics of the detection element are held unchanged.

A split-flow-type flowmeter according to a preferred aspect of the present invention is such that a recess is formed in the detection unit so as to serve as the second flow path and the detection element is disposed on the bottom of the recess. Preferably, a partition for partitioning the first flow path is disposed within the introduction unit to thereby form the split-flow passage into the shape of the letter U by means of the partition and the first and second flow paths (to thereby form a bent or curved split-flow passage).

A split-flow-type flowmeter according to a preferred aspect of the present invention comprises a main-body unit having a cavity formed therein for accommodating a base portion of the introduction unit and the detection unit and on which a control circuit for controlling the detection element is mounted, and is such that a portion of the main-body unit surrounding the cavity is fixed to the main-flow pipe.

A split-flow-type flowmeter according to a preferred aspect of the present invention is such that the main-body unit or the introduction unit comprises a U-shaped wall curved in such a manner as to enclose a portion of the partition located on the detection element side and adapted to further partition the first flow path.

A split-flow-type flowmeter according to a preferred aspect of the present invention is characterized in that the width of a flow path (first flow path) located away from the detection element is greater than that of a flow path (second flow path) located near the detection element. Preferably, an end portion of a surface of the detection unit defining the flow path located near the detection element (second flow path) is chamfered in a straight line or a curved line.

A split-flow-type flowmeter according to the present invention can measure not only flow rate but also parameters related to flow, such as flow velocity, as needed.

In order to realize stable measurement at high accuracy, a preferred aspect of the present invention comprises a bypass flow path connecting straight the flow inlet and the flow outlet and bypassing the split-flow passage and/or a venturi for decreasing the diameter of the split-flow passage in the vicinity of the detection element. The bypass flow path stabilizes supply of fluid to be measured to the detection element and facilitates diversion of fluid to be measured (flow in the main-flow pipe) into the split-flow passage. The venturi effectively eliminates turbulence of fluid to be measured which would otherwise arise on the detection surface of the detection element. Thus, even when pulsation or pulsation plus backflow is generated, measurement is stabilized and measurement at high accuracy becomes possible.

Particularly, in the case of the split-flow passage assuming the structure of flow path symmetrical with respect to the detection element, employment of an orifice for decreasing the diameter of a flow cross section of the bypass flow path further stabilizes flow reaching the detection element even when pulsation or pulsation plus backflow is generated.

According to a preferred aspect of the present invention, an orifice is disposed in the bypass flow path to thereby determine the flow rate of fluid to be measured and diverted toward the detection element, by means of the amount of projection of a flow path wall of the orifice or the area of opening of the orifice. Thus, the flow rate of flow heading for the detection element can be quantitatively controlled.

According to a preferred aspect of the present invention, means for forming flow hitting obliquely on the detection surface of the detection element is provided in the split-flow passage. The flow control means causes steady flow onto the detection surface of the detection element, so that flow to be detected reliably flows on the detection surface. Additionally, since generation of vortex and separation in the vicinity of the detection surface is suppressed, detection accuracy and reproducibility are enhanced.

According to a preferred aspect of the present invention, flow control means for forming flow hitting obliquely on the detection surface of the detection element or forming flow flowing obliquely with respect to the detection surface assumes the form of a flow path surface (an elevated portion) elevated above the detection surface, which elevated flow path is located upstream of the detection element, or upstream and downstream of the detection element. The form of elevation is not particularly limited so long as flow hitting obliquely on the detection surface is formed. Preferably, the form of elevation is concave or convex, or the elevated surface is a linear, polygonal, or concavely-curved slant surface.

According to a preferred aspect of the present invention, the detection surface of the detection element is exposed to the interior of the split-flow passage (detection tube) at an inflection portion of the split-flow passage. Preferably, the split-flow passage is attached to the main-flow pipe (a pipe at which measurement is performed) in a perpendicularly intersecting condition, and the detection element is disposed at an inflection portion (a bent portion, or a curved portion of flow path) of the split-flow passage. Alternatively, the detection element is disposed at or in the vicinity of a portion of the split-flow passage where flow is inverted or the direction of flow is changed greatly. Preferably, the detection surface of the detection element is exposed to a portion of the interior of the split-flow passage where flow is fast. Preferably, the detection surface of the detection element is exposed to a portion, or its vicinity, of the interior of the split-flow passage where flow is throttled and then changes its direction.

According to a preferred aspect of the present invention, the detection element mounted on the bottom wall of the split-flow passage is located outside the main-flow pipe. Thus, the detection element can be readily mounted or replaced. Also, output from the detection element can be readily led out.

A preferred aspect of the present invention can use the following detection element. Specifically, the detection element is a thermal detection element comprising a semiconductor chip and four thin-film resistors formed on the chip. More specifically, a diaphragm section and a rim section are formed on a semiconductor layer. The diaphragm section includes (1) an upstream temperature sensor, (2) a downstream temperature sensor, and (3) a heater disposed between the upstream temperature sensor and the downstream temperature sensor. The rim section includes (4) an ambient temperature sensor. The diaphragm section is finished very thin and thermally insulated.

Next will be described the principle of detection of flow-related parameters, such as flow velocity and flow rate, by use of the detection element.

(1) Power supplied to the heater is controlled such that a constant difference is maintained between the temperature of the heater and the ambient temperature.

(2) Thus, when flow is not present, the upstream temperature sensor and the downstream temperature sensor indicate substantially the same temperature.

(3) However, when flow is present, heat escapes from the surface of the upstream temperature sensor; thus, the temperature of the upstream temperature sensor drops. Because of an increase in thermal input from the heater, a temperature change of the downstream temperature sensor is smaller than that of the upstream temperature sensor. Notably, in some cases, the temperature of the downstream temperature sensor may rise.

(4) Flow rate, flow velocity, or a like parameter is detected on the basis of the temperature difference between the upstream temperature sensor and the downstream temperature sensor. The direction of flow is detected from the sign of the temperature difference. Notably, the temperature difference can be detected on the basis of a change in electrical resistance caused by temperature.

A preferred aspect of the present invention can use the following other detection element. Specifically, the detection element is a thermal detection element comprising a semiconductor chip and three thin-film resistors formed on the chip. More specifically, a diaphragm section and a rim section are formed on a semiconductor layer. The diaphragm section includes (1) an upstream heater and (2) a downstream heater. The rim section includes (3) an ambient temperature sensor. The diaphragm section is finished very thin and thermally insulated.

Next will be described the principle of detection of flow-related parameters, such as flow velocity and flow rate, by use of the detection element.

(1) Power supplied to the upstream and downstream heaters is controlled such that a constant difference is maintained between the upstream/downstream heater and the ambient temperature.

(2) Thus, when flow is not present, the upstream heater and the downstream heater indicate substantially the same temperature.

(3) However, when flow is present, heat escapes from the surfaces of the upstream and down stream heaters; thus, the temperature of the upstream and downstream heaters drops. Because of an increase in thermal input from the upstream heater, a temperature change of the downstream heater is smaller than that of the upstream heater. Notably, in some cases, the temperature of the downstream heater may rise.

(4) Flow rate, flow velocity, or a like parameter is detected from the difference in current or voltage required to maintain a constant temperature between the upstream heater and the downstream heater as obtained on the basis of a temperature drop of each of the upstream and downstream heaters. The direction of flow is detected from the sign of the current or voltage difference. Notably, the temperature drop can be detected on the basis of a change in electrical resistance caused by temperature.

According to a preferred aspect of the present invention, the detection element measures flow-related values including at least flow rate and/or flow velocity on the basis of temperature.

A split-flow-type flowmeter of the present invention can be installed in an intake system of an engine to be mounted in various kinds of vehicles, two-wheeled and four-wheeled, in order to measure an intake rate or a like parameter. For example, a split-flow-type flowmeter of the present invention is installed in an intake system of an engine to be mounted in a four-wheeled vehicle, somewhere between the interior of an air cleaner and a throttle valve. A split-flow-type flowmeter of the present invention is installed in an intake system of an engine to be mounted on a two-wheeled vehicle; specifically, on an intake pipe (air funnel) connected to a cylinder, in order to measure an intake flow rate, an intake flow velocity, or a like parameter.

BRIEF DESCRIPTION OF THE DRAWINGS

FIGS. 2(A)–(D) are views showing the construction of a split-flow-type flowmeter according to Example 2 of the present invention and steps of assembly.

Figure 1:
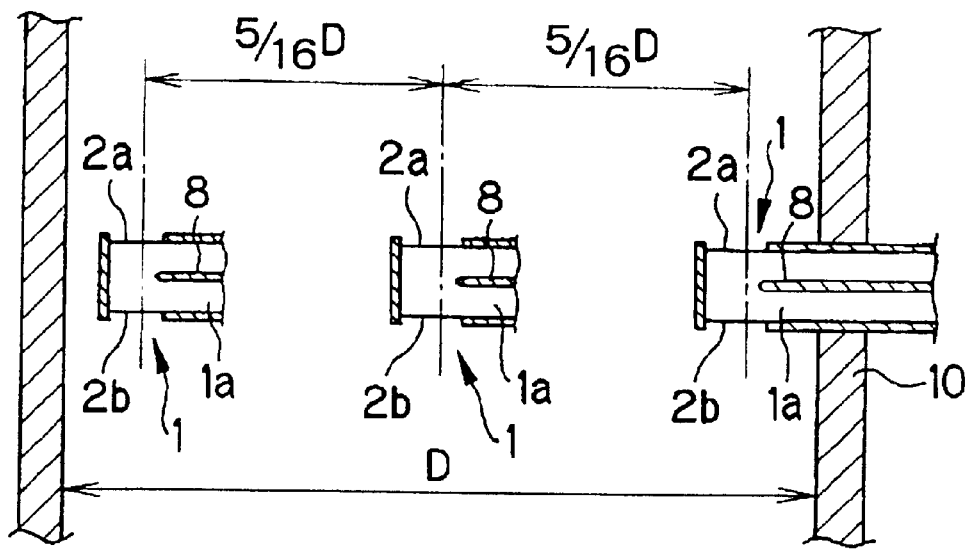
FIGS. 1(A) and (B) are schematic views showing the structure of a split-flow passage and the arrangement of a flow inlet/flow outlet of the split-flow passage according to Example 1 of the present invention, FIG. 1(A) showing a preferred range of arrangement of the flow inlet/flow outlet, and FIG. 1(B) showing a preferred range of width of the flow inlet/flow outlet.
Figure 1:
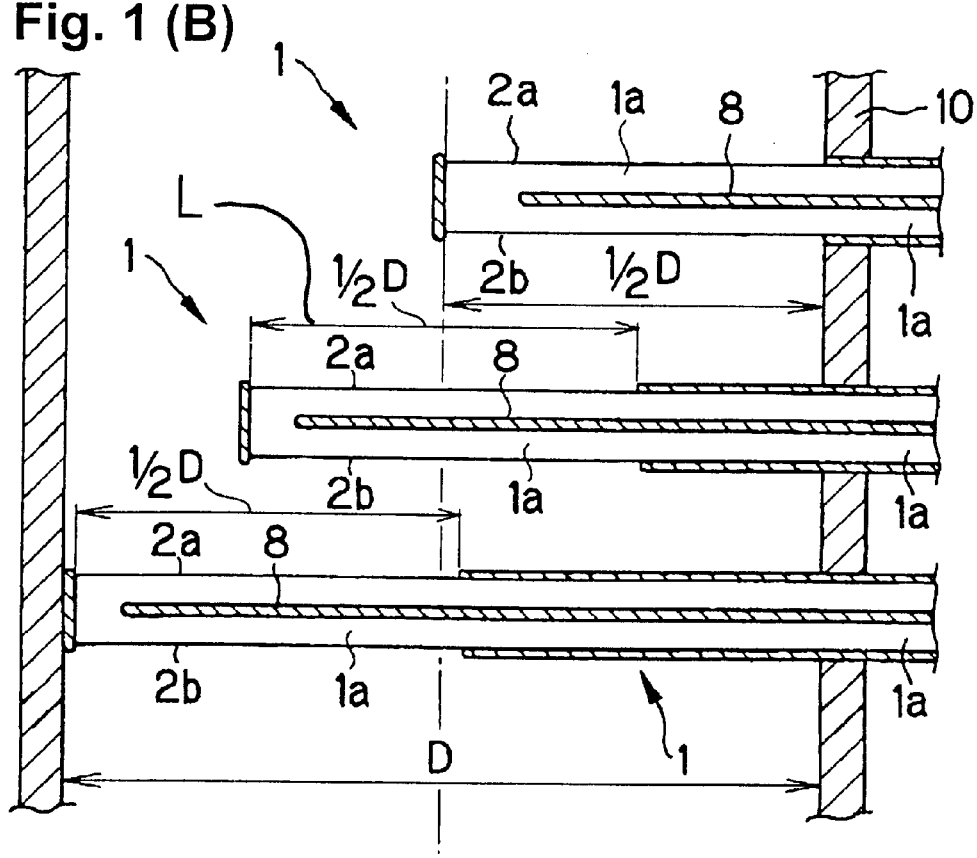

Description of symbols shown in the drawings:
1: flow splitter tube
1a: split-flow passage
1b: inner split-flow passage
1c: outer split-flow passage
2: introduction unit
2a: flow inlet (flow outlet)
2b: flow outlet (flow inlet)
2c, 2d: undulations
3: detection unit
4: main-body unit
4a: mortise 5: circuit board
6: cover
7: detection element
8: partition
8a: larger-diameter portion
9: U-shaped wall
10: main-flow pipe
12a, 12b: bolts
20: first flow path (flow path within introduction unit)
21: radially outward flange
21a: tenon
21b: annular hook
22: bypass flow path
30: second flow path (flow path within detection unit)
31: radially inward flange
40: connection flow path (flow path within main-body unit)
41: radially inward flange
41b: annular taper groove
100: flow splitter tube
100a: split flow passage formed inside splitter tube 100
102: flow splitter tube unit
D: flow cross section of main-flow pipe (pipe diameter)
L: width of opening of flow inlet/flow outlet of split-flow passage

DESCRIPTION OF THE PREFERRED EMBODIMENTS

The preferred embodiments are next described with reference to the drawings. However, the present invention should not be construed as being limited thereto.

EXAMPLE 1

Example 1 of the present invention will be described with respect to the structure of a split-flow passage, arrangement of a flow inlet and a flow outlet of the split-flow passage within a main-flow pipe, and the like.

Referring to FIG. 1(A), an end portion of a flow splitter tube 1 is inserted into a main-flow pipe (circular pipe) 10 having a flow cross-sectional diameter (pipe diameter) D. The flow splitter tube 1 includes a split-flow passage 1a curved into the shape of the letter U. A detection element is disposed on a bottom portion (not shown) of the U-shaped split-flow passage 1a. The split-flow passage 1a assumes a flow path structure symmetrical with respect to the detection element. A flow inlet 2a and a flow outlet 2b of the split-flow passage 1a face in mutually opposite directions along the flow direction of the main-flow pipe 10 and open symmetrically at the same position on the flow cross section of the main-flow pipe 10. In order to divert into the split-flow passage 1a a portion of relatively high flow rate of flow from the main-flow pipe 10, the center of opening of the flow inlet 2a/flow outlet 2b is positioned within the radius 5D/16 from the center of the main-flow pipe 10. Thus, a portion of relatively high flow velocity of flow is diverted into the split-flow passage 1a from the main-flow pipe 10. Similarly, a regular flow component and a backflow component can be diverted into the split-flow passage 1a. Thus, when pulsation arises, the flow rate of a pulsating flow can be detected with good response. Also, the flow rate of a regular flow component and the flow rate of a backflow component can be detected equivalently.

Next will be described a preferable width of opening of the flow inlet/flow outlet of the split-flow passage. Referring to FIG. 1(B), an end portion of the flow splitter tube 1 is inserted into the main-flow pipe (circular pipe) 10 having the flow cross-sectional diameter (pipe diameter) D. The flow splitter tube 1 includes the split-flow passage 1a curved into the shape of the letter U. The detection element is disposed on a bottom portion (not shown) of the U-shaped split-flow passage 1a. The split-flow passage 1a assumes a flow path structure symmetrical with respect to the detection element. The flow inlet 2a and the flow outlet 2b of the split-flow passage 1a face and open in mutually opposite directions along the flow direction of the main-flow pipe 10 and are positioned symmetrically with respect to the flow cross section of the main-flow pipe 10. In order to divert into the split-flow passage 1a a portion of relatively high flow rate of flow from the main-flow pipe 10, the center of opening of the flow inlet 2a/flow outlet 2b is positioned within the radius 5D/16 from the center of the main-flow pipe 10. Also, L is not greater than D/2, where L is the width of opening of the flow inlet 2a/flow outlet 2b. Thus, flows of different flow velocities distributed on the flow cross section of the main-flow pipe 10 can be diverted into the split-flow passage, whereby the current state of flow can be captured accurately.

EXAMPLE 2 AND COMPARATIVE EXAMPLE

Example 2 of the present invention to be described below is a preferred construction and a preferred mounting method of a split-flow-type flowmeter in order to achieve the structure of the split-flow passage and the arrangement of the flow inlet/flow outlet of the split-flow passage within the main-flow pipe described above in Example 1.

First, the construction and the mounting method of a split-flow-type flowmeter according to Example 2 of the present invention will be described with reference to FIGS. 2(A) to 2(D) showing steps of assembling work. Subsequently, a mounting method of a split-flow-type flowmeter according to Comparative Example will be described with reference to FIGS. 3(A) to 3(D) showing steps of assembling work. Example 2 and Comparative Example differ in the following point. In the split-flow-type flowmeter according to Example 2, a flow path is formed beforehand in a detection unit. By contrast, in the split-flow-type flowmeter according to Comparative Example, a flow path is not formed in a detection unit.

Referring to FIG. 2(A), a detection unit 3 has a second flow path 30 formed therein, which second flow path 30 will finally become a flow path in the vicinity of a detection element 7. In the first step, the detection element 7 is fixedly attached to the detection unit 3 such that a detection portion of the detection element 7 faces the second flow path 30. A displacement (particularly a displacement along the flow direction in the main-flow pipe) of the attached detection element 7 with respect to the detection unit 3 (second flow path 30) greatly influences the flow-rate characteristic in the vicinity of the detection element 7. However, since the detection unit 3 is originally isolated from other units and the detection element 7 is fixedly attached to the detection unit 3 at such a position that facilitates attachment of the detection element 7, the attachment position of the detection element 7 on the detection unit 3 can be controlled accurately.

Referring to FIG. 2(B) showing the second step, the detection unit 3 prepared above is fixedly attached to a predetermined position on a main-body unit 4. Notably, a displacement of the attached detection unit 3 (second flow path 30) with respect to the main-body unit 4 influences the flow-rate characteristic in the vicinity of the detection element 7, but to a small extent. This holds true in the case in which a U-shaped wall is formed in the main-body unit 4.

Referring to FIG. 2(C) showing the third step, a circuit board 5 for driving and controlling the detection element 7 is mounted on the main-body unit 4 from the upper side thereof. A displacement of the mounted circuit board 5 with respect to the main-body 4 has no influence on the flow-rate characteristic in the vicinity of the detection element 7.

Referring to FIG. 2(D) showing the fourth step, an introduction unit 2 is inserted into the main-body unit 4 from the lower side thereof and fixedly attached thereto. A displacement of the attached introduction unit 2 with respect to the detection unit 3 or the main-body unit 4 influences the flow-rate characteristic in the vicinity of the detection element 7, but to a small extent.

In the fifth step, the main-body unit 4 having the detection unit 3, the circuit board 5, and the introduction unit 2 fixedly attached thereto is attached to the main-flow pipe (not shown). In this step, a displacement of the attached main-body unit 4 with respect to the main-flow pipe influences the flow-rate characteristic in the vicinity of the detection element 7, but to a small extent.

In the case of the split-flow-type flowmeter according to Example 2 of the present invention, even when a displacement of, for example, the detection unit 3 arises, the influence of the displacement on the flow-rate characteristic in the vicinity of the detection element 7 is minor. A displacement of the attached detection element 7 with respect to the detection unit 3 having the second flow path 30 formed therein influences greatly the flow-rate characteristic in the vicinity of the detection element 7 but can be reduced to the greatest possible extent. Accordingly, variations in flow-rate characteristic become small among production lots of flowmeters according to Example 2.

Next, the construction and the mounting method of a split-flow-type flowmeter according to the Comparative Example will be described.

Figure 3:
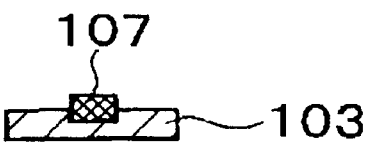
FIGS. 3(A)–(D) are views showing the construction of a split-flow-type flowmeter according to the Comparative Example and steps of assembly.
Figure 3:
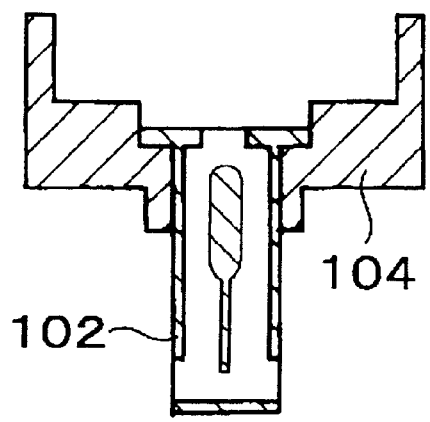
Figure 3:
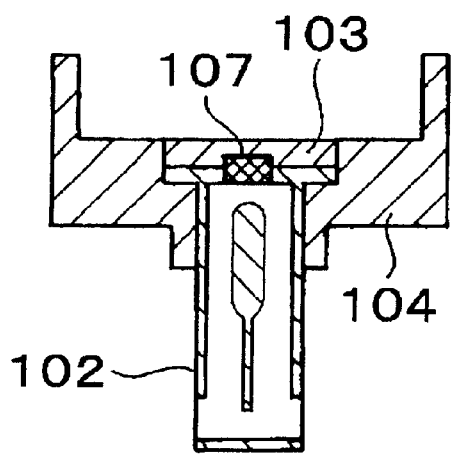
Figure 3:
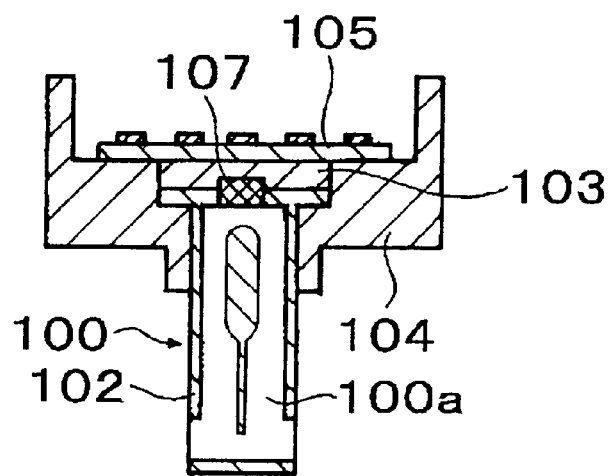

Referring to FIG. 3(A), a detection unit 103 has no flow path formed therein. In the first step, a detection element 107 is fixedly attached to the detection unit 103.

Referring to FIG. 3(B) showing the second step, a flow splitter tube unit 102 of the flow splitter tube 100 is inserted into a main-body unit 104 from the upper side thereof and fixedly attached thereto. Notably, a displacement of the attached flow splitter tube unit 102 with respect to the main-body unit 104 influences the flow-rate characteristic in the vicinity of the detection element 107, but to a small extent.

Referring to FIG. 3(C) showing the third step, the detection unit 103 is attached to the main-body unit 104 from the upper side thereof. Since the entire split-flow passage is formed in the flow splitter tube unit 102, displacement of the detection unit 103 with respect to the flow splitter tube unit 102 attached to the main-body unit 104 influences greatly the flow-rate characteristic in the vicinity of the detection element 107.

Referring to FIG. 3(D) showing the fourth step, a circuit board 105 is fixedly attached to the main-body unit 104 from the upper side thereof. Displacement of the attached circuit board 105 with respect to the main-body unit 104 has no influence on the flow-rate characteristic in the vicinity of the detection element 107.

In the fifth step, the main-body unit 104 having the detection unit 103, the circuit board 105, and the flow splitter tube unit 102 fixedly attached thereto is attached to the main-flow pipe (not shown). In this step, a displacement of the attached main-body unit 104 with respect to the main-flow pipe influences the flow-rate characteristic in the vicinity of the detection element 107, but to a small extent.

According to the above-described steps of assembling the split-flow-type flowmeter according to the Comparative Example, the third step (see FIGS. 3(B) and 3(C)) is likely to involve occurrence of a displacement which is difficult to control (difficult to avoid) and has a great influence on the flowrate characteristic in the vicinity of the detection element. Accordingly, variations in flow-rate characteristic become great among production lots of flowmeters according to the Comparative Example.

EXAMPLE 3

Example 3 of the present invention to be described below is a preferred split-flow-type flowmeter and a construction thereof in order to achieve the structure of the split-flow passage and the arrangement of the flow inlet/flow outlet of the split-flow passage within the main-flow pipe described above in Example 1.

Figure 4:
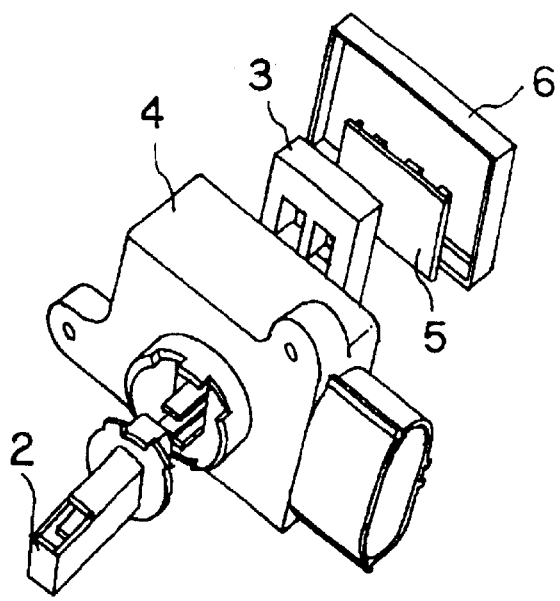
FIG. 4(A) is a perspective view of a split-flow-type flowmeter according to Example 3 of the present invention.
FIG. 4(B) is an enlarged view showing a portion of engagement between an introduction unit and a main-body unit of the flowmeter shown in FIG. 4(A)
FIG. 4(C) is a sectional view taken along a split-flow passage of the flowmeter shown in FIG. 4(A).
Figure 4:
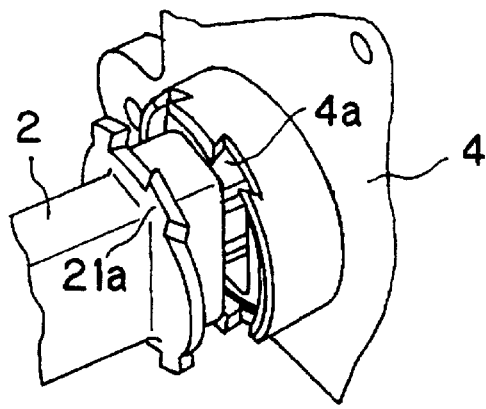
Figure 4:
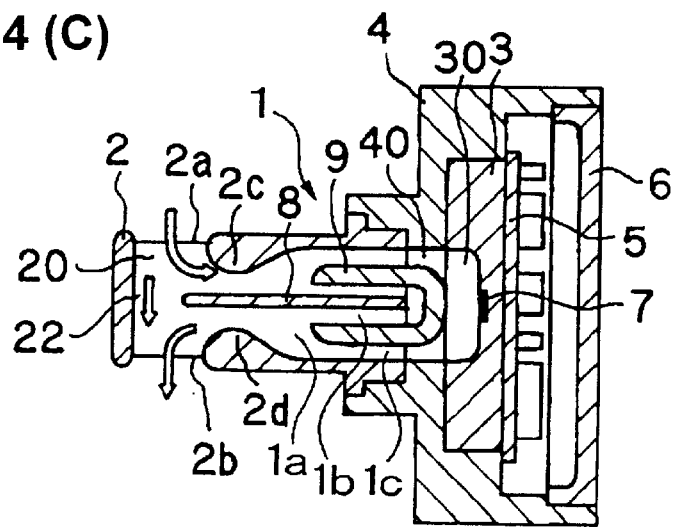

Referring to FIG. 4(A), the split-flow-type flowmeter according to Example 3 of the present invention is an assembly of a plurality of units; i.e., an assembly of the introduction unit 2, the main-body unit 4, the detection unit 3, the circuit board 5 for driving and controlling the detection element 7, and a cover 6. This assembly is attached to the main-flow pipe, which is a pipe at which measurement is performed. Referring to FIG. 4(C) showing an assembled state, the flow splitter tube 1 is composed of the introduction unit 2, the main-body unit 4, and the detection unit 3. The split-flow passage 1a is composed of a first flow path 20 formed in the introduction unit 2, a connection flow path 40 formed in the main-body unit 4, and a second flow path 30 formed in the detection unit 3. Subsequently, these units will be described in detail.

Introduction Unit 2

Referring to FIGS. 4(B) and 4(C), the flow inlet (serving also as a flow outlet) 2a and the flow outlet (serving also as a flow inlet) 2b are formed at opposite sides of an end portion of the introduction unit 2. The first flow path 20 communicating with the flow inlet 2a and the flow outlet 2b is formed within the introduction unit 2. The first flow path 20 assumes a structure symmetrical with respect to a predetermined plane. The first flow path 20 is partitioned by means of a partition 8 formed within the introduction unit 2. Undulations 2c and 2d are formed in the introduction unit 2 and in the vicinity of the flow inlet 2a and the flow outlet 2b, respectively. A bypass flow path 22 connecting straight the flow inlet 2a and the flow outlet 2b is formed in the end portion of the introduction unit 2. A plurality of tenons 21a are formed circumferentially on a flange formed at the base end of the introduction unit 2.

Main-Body Unit 4

Referring to FIGS. 4(B) and 4(C), a cavity is formed within the main-body unit 4 and accommodates a base end portion of the introduction unit 2, the detection unit 3, and the circuit board 5. The rear end of the cavity is closed with the cover 6. A U-shaped wall 9 is formed in the main-body unit 4 so as to be located at the front-end portion of the cavity. In an assembled state, the U-shaped wall 9 projects into the first flow path 20 so as to enclose the rear end portion of the partition 8, thereby further partitioning the first flow path 20. A remaining portion of the cavity located outside the U-shaped wall 9 serves as the connection flow path 40. The connection flow path 40 assumes a structure symmetrical with respect to a predetermined plane. A bottom portion of the U-shaped wall 9 is positioned on the plane of abutment between the connection flow path 40 and the second flow path 30, thereby forming a venturi in the split-flow passage 1a above the detection element 7.

A front end portion of the main-body unit 4 is formed into an annular portion. A plurality of reverse tapered mortises 4a are formed circumferentially in the annular portion.

Detection Unit 3

Referring to FIG. 4(B) and 4(C), the detection unit 3 has a recess; i.e., the second flow path 30, formed therein and a detection element is disposed on the bottom surface of the recess to thereby be exposed to flow within the second flow path 30. The second flow path 30 assumes a structure symmetrical with respect to a predetermined plane. The detection unit 3 and the main-body unit 4 are integrated beforehand into a single unit, to which the circuit board 5 is attached.

Assembling Split-Flow Passage and Attaching to Main-Flow Pipe

Next will be described a method for assembling the split-flow-type flowmeter and a method for attaching the split-flow-type flowmeter to the main-flow pipe. First, a plurality of reverse tapered tenons 21a formed on the introduction unit 2 are fitted into a plurality of corresponding reverse tapered mortises 4a to thereby fix the introduction unit 2 to the main-body unit 4. Next, the detection unit 3 is attached to the main-body unit 4. Thus, the first flow path 20 in the introduction unit 2 communicates with the second flow path 30 in the detection unit 3 via the connection flow path 40 in the main-body unit 4, thereby forming the split-flow passage 1a. Next, the introduction unit 2 is inserted into the main-flow pipe through an opening formed in the wall of the main-flow pipe until an annular surface of the main-body unit 4 abuts the outer wall surface of the main-flow pipe, thereby attaching the main-body unit 4 to the wall of the main-flow pipe.

In the split-flow-type flowmeter described above, the detection element and a flow path in the vicinity of the detection element belong to the common unit. Thus, without changing the flow path in the vicinity of the detection element, a user can select an introduction unit having an appropriate length according to the diameter of the main-flow pipe; for example, an introduction unit having such a length that the flow inlet and the flow outlet are positioned at the radial center of the main-flow pipe.

EXAMPLE 4

A split-flow-type flowmeter according to Example 4 of the present invention and a construction thereof will be described. In order to avoid repeated description, structural features, actions, and effects common between the flowmeters of Examples 3 and 4 are not described. Description of Example 4 focuses on features in which Example 4 differs from Example 3.

Figure 5:
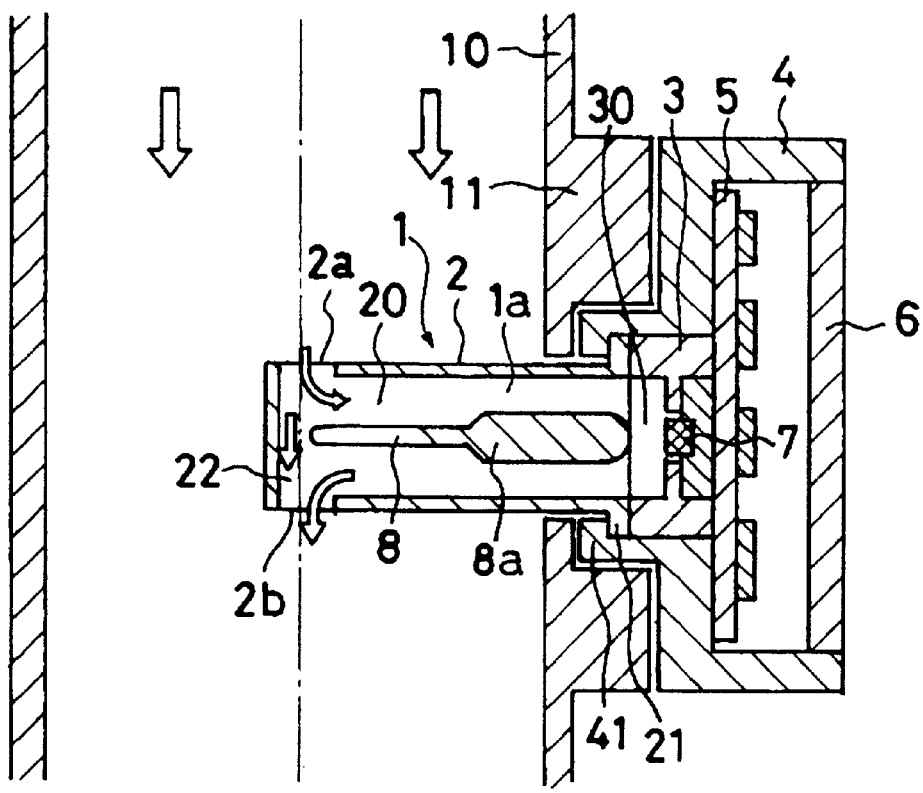
FIG. 5 is a sectional view of a split-flow-type flowmeter according to Example 4 of the present invention.

Referring to FIG. 5, the split-flow-type flowmeter according to Example 4 of the present invention is an assembly of the introduction unit 2, the main-body unit 4, the detection unit 3, the circuit board 5 for driving and controlling the detection element 7, and the cover 6. This assembly is attached to the main-flow pipe, which is an object of measurement. In the assembled state, the flow splitter tube 1 is composed of the introduction unit 2 and the detection unit 3. The split-flow passage 1a is composed of the first flow path 20 formed in the introduction unit 2 and the second flow path 30 formed in the detection unit 3.

An opening for attachment of the split-flow-type flowmeter is formed in the wall of the main-flow pipe 10. A boss portion 11 is formed around the opening in such a manner as to project outward from the main-flow pipe 10. A radially inward flange 41 is formed at the front end of the main-body unit 4. A radially outward flange 21 is formed at the base end of the introduction unit 2. In the attached state, the radially outward flange 21 and the radially inward flange 41 are held between the inner bottom surface of the boss portion 11 and the annular front-end face of the detection unit 3.

A rear-end portion of the partition 8 is formed into a larger-diameter portion 8a. The larger-diameter portion 8a projects to (in the vicinity of) the plane of abutment between the first flow path 20 and the second flow path 30, thereby forming a venturi in the split-flow passage extending on the detection element 7. The larger-diameter portion 8a rectifies or regulates flow directed toward the detection element 7.

EXAMPLE 5

A split-flow-type flowmeter according to Example 5 of the present invention and a construction thereof will be described. As in the case of Example 4, description of Example 5 focuses on features in which Example 5 differs from Example 3.

Figure 6:
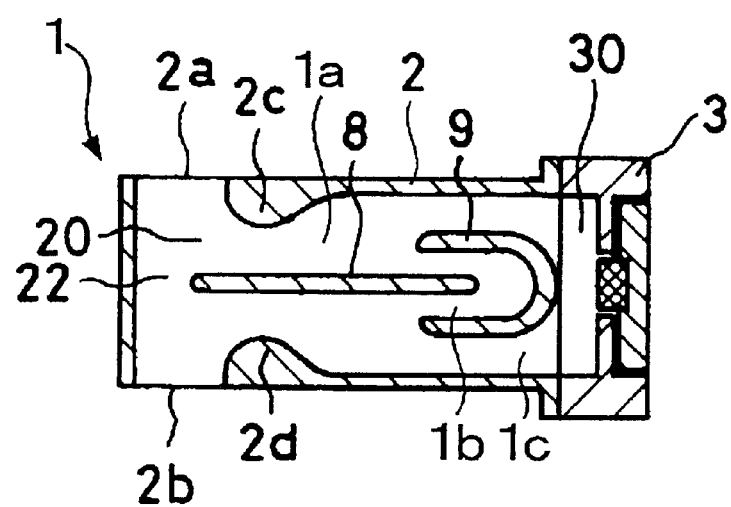
FIG. 6 is a sectional view showing a main portion of a split-flow-type flowmeter according to Example 5 of the present invention.

Referring to FIG. 6, in the split-flow-type flowmeter according to Example 5 of the present invention, the flow splitter tube 1 is composed of the introduction unit 2 and the detection unit 3. The split-flow passage 1a is composed of the first flow path 20 formed in the introduction unit 2 and the second flow path 30 formed in the detection unit 3. The U-shaped wall 9 enclosing an end portion of the partition 8 is formed in the introduction unit 2. Notably, in Example 3, the U-shaped wall is formed in the main-body unit.

EXAMPLE 6

A split-flow-type flowmeter according to Example 6 of the present invention and a construction thereof will be described. As in the case of Example 4, description of Example 6 focuses on features in which Example 6 differs from Example 3.

Figure 7:
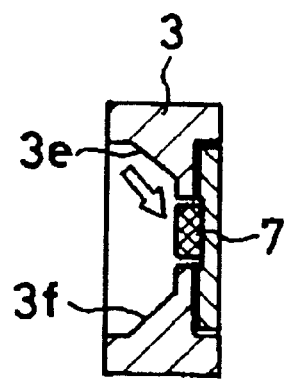
FIGS. 7(A) and (B) are partial sectional views showing a detection element and its peripheral portion of a split-flow-type flowmeter according to Example 6 of the present invention.
Figure 7:
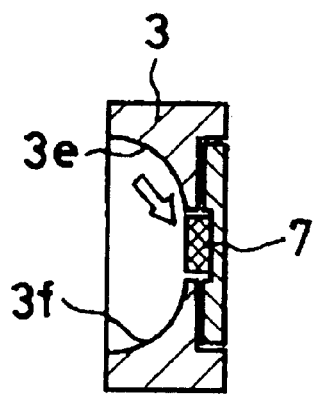

Referring to FIGS. 7(A) and 7(B), in the detection units 3 for use in the split-flow-type flowmeter, flow path walls 3e and 3f located at opposite sides of the detection element 7 are elevated. Thus, downflow; i.e., flow hitting obliquely on the detection surface of the detection element 7 is formed. The flow path walls 3e and 3f in FIG. 7(A) each have a flat wall surface, while the flow path walls 3e and 3f in FIG. 7(B) each have a concave wall surface.

EXAMPLE 7

A split-flow-type flowmeter according to Example 7 of the present invention and a construction thereof will be described. Example 7 is an example for describing attachment of the introduction unit 2 to the main-body unit 4.

Figure 8:
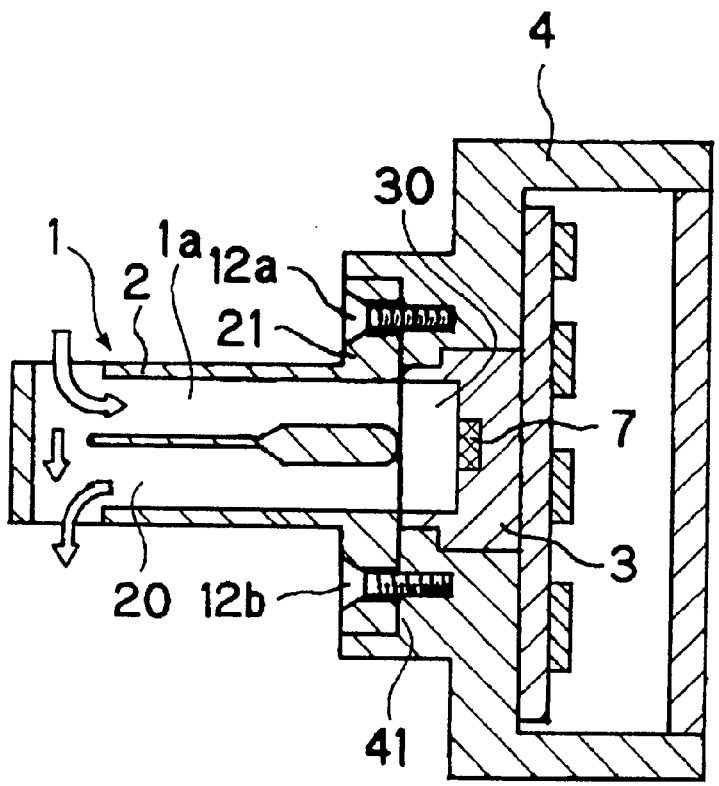
FIG. 8 is a sectional view of a split-flow-type flowmeter according to Example 7 of the present invention.

Referring to FIG. 8 showing the split-flow-type flowmeter according to Example 7 of the present invention, the flow splitter tube 1 is composed of the introduction unit 2 and the detection unit 3. The split-flow passage 1a is composed of the first flow path 20 formed in the introduction unit 2 and the second flow path 30 formed in the detection unit 3. While the radially outward flange 21 formed at the base end of the introduction unit 2 abuts the radially inward flange 41 projecting into the cavity formed in the main-body unit 4, the introduction unit 2 is attached to the main-body unit 4 by means of bolts 12a and 12b.

EXAMPLE 8

A split-flow-type flowmeter according to Example 8 of the present invention and a construction thereof will be described. The split-flow-type flowmeter according to Example 8 is such that the main-body unit is integrated with the detection unit, which is attached to the main-flow unit.

Figure 9:
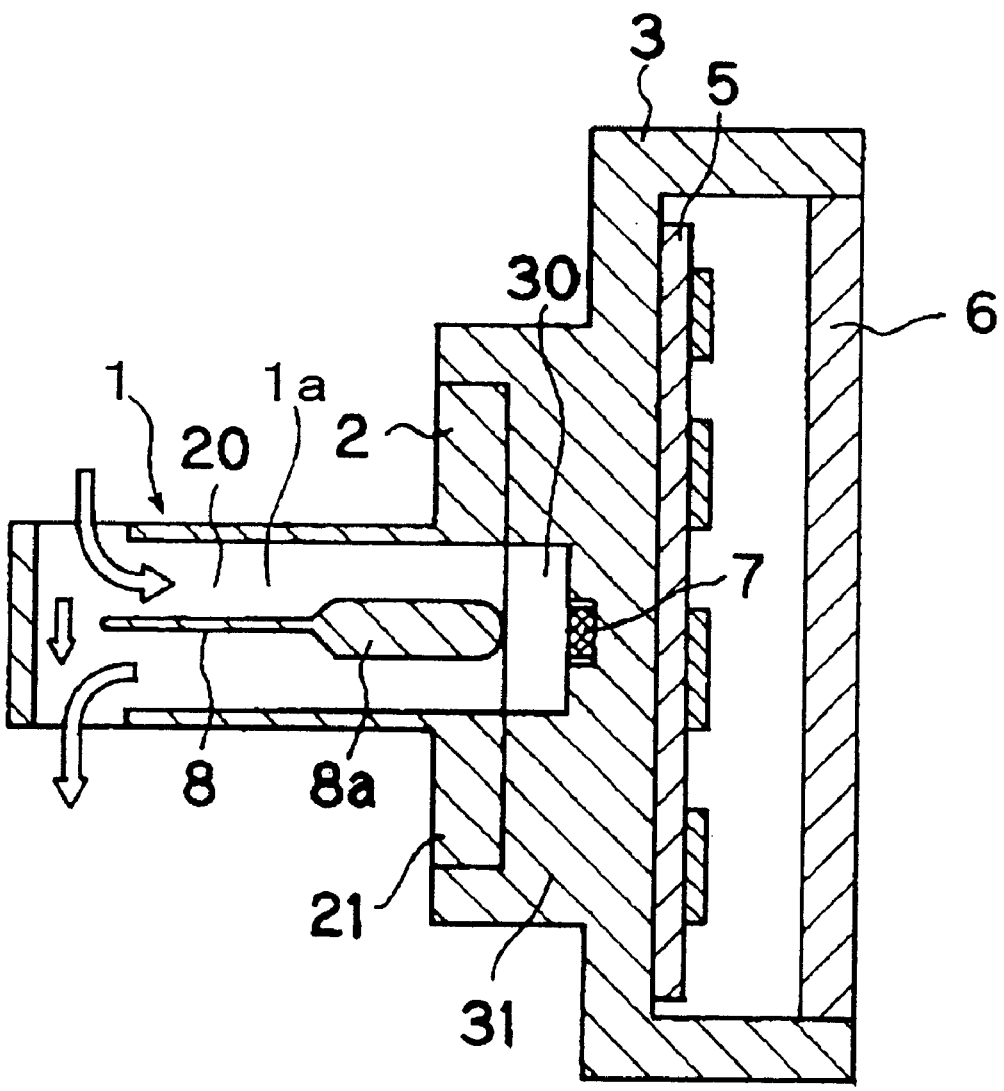
FIG. 9 is a sectional view of a split-flow-type flow meter according to Example 8 of the present invention.

Referring to FIG. 9 showing the split-flow-type flowmeter according to Example 8 of the present invention, the flow splitter tube 1 is composed of the introduction unit 2 and the detection unit 3, which also serves as the main-body unit. The split-flow passage 1a is composed of the first flow path 20 formed in the introduction unit 2 and the second flow path 30 formed in the detection unit 3. A cavity including a cavity portion which will become the second flow path 30 is formed at the front-end side of the relatively large detection unit 3. A radially inward flange 31 is formed so as to face the front-end cavity. A cavity is also formed at the rear-end side of the detection unit 3. The circuit board 5 is mounted on the bottom of the rear-end cavity. A relatively large, radially outward flange 21 is formed at the base end of the introduction unit 2. When the split-flow-type flowmeter is to be attached to the main-flow pipe, the radially outward flange 21 is fitted into the radially inward flange 21. Then, an annular wall of the detection unit 3 surrounding the front-end cavity is fitted into a boss formed on the outer wall of the main-flow pipe.

EXAMPLE 9

A split-flow-type flowmeter according to Example 9 of the present invention and a construction thereof will be described. In order to avoid repeated description, features common between Examples 9 and 4 are not described. Description of Example 9 focuses on features in which Example 9 differs from Example 4.

Figure 10:
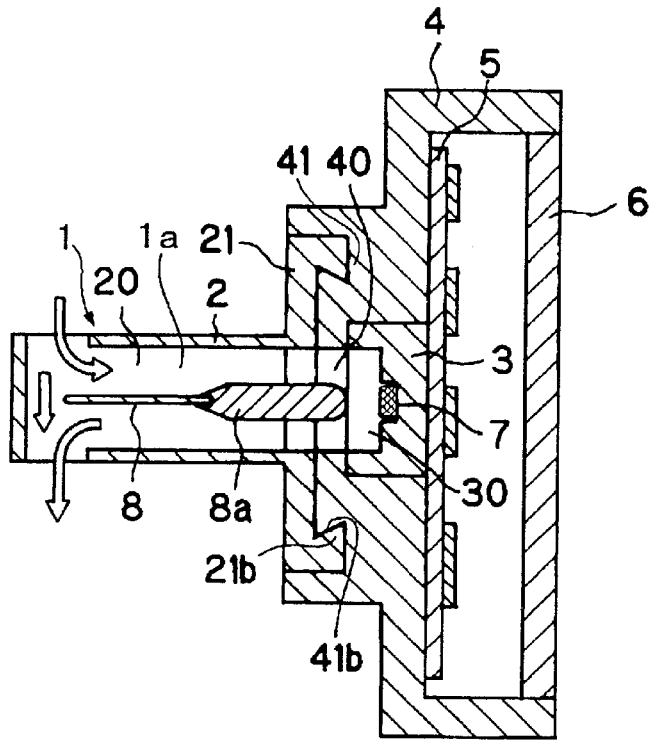
FIG. 10 is a sectional view of a split-flow-type flow meter according to Example 9 of the present invention.

Referring to FIG. 10 showing the split-flow-type flowmeter according to Example 9 of the present invention, the flow splitter tube 1 is composed of the introduction unit 2, the main-body unit 4, and the detection unit 3. The split-flow passage 1a is composed of the first flow path 20 formed in the introduction unit 2, the connection flow path 40 formed in the main-body unit 4, and the second flow path 30 formed in the detection unit 3. The radially inward flange 41 is formed at the front end of the main-body unit 4 so as to project radially inward. The radially inward flange 41 has an annular taper groove 41b formed therein. A radially outward flange 21 is formed at the base end of the introduction unit 2. An annular hook 21b to be fitted into the annular taper groove 41b is formed at an outer circumferential portion of the radially outward flange 21. In the attached state, the radially inward flange 41 of the main-body unit 4 is sandwiched between the radially outward flange 21 of the introduction unit 2 and the annular front-end face of the detection unit 3.

The first flow path 20 and the second flow path 30 communicate with each other via the connection flow path 40 belonging to the main-body unit 4. As mentioned above, the first flow path 20, the connection flow path 40, and the second flow path 30 constitute the split-flow passage 1a. An end of the larger-diameter portion 8a projects to (in the vicinity of) the plane of abutment between the connection flow path 40 and the second flow path 30, thereby forming a venturi in the split-flow passage extending on the detection element 7.

EXAMPLE 10

Figure 11:
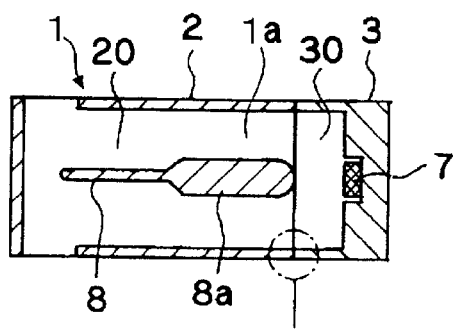
FIG. 11(A) is a sectional view of a split-flow passage of a split-flow-type flowmeter according to Example 10 of the present invention.
FIG. 11(B) is an enlarged view showing abutment of flow paths constituting the split-flow passage.
Figure 11:
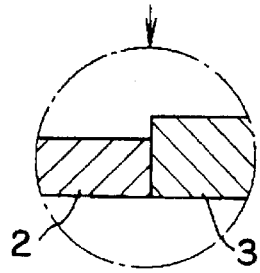

A split-flow-type flowmeter according to Example 10 of the present invention will be described. Referring to FIGS. 11(A) and 11(B), in the split-flow-type flowmeter, at the plane of abutment between the first flow path 20 formed in the introduction unit 2 and the second flow path 30 formed in the detection unit 3 (the larger-diameter portion 8a of the partition 8 extends to the plane of abutment), the inner wall of the second flow path 30 projects into the split-flow passage 1a beyond that of the first flow path 20 to thereby form a stepped abutment. Thus, the width of a flow path (first flow path 20) located away from the detection element 7 is greater than that of a flow path (second flow path 30) located near the detection element 7, thereby rectifying flow in the split-flow passage directed toward the detection element 7.

EXAMPLE 11

A split-flow-type flowmeter according to Example 11 of the present invention will be described. Example 11 shows other embodiments of the profile of a flow path located in the vicinity of the plane of abutment between the first flow path and the second flow path in Example 10 described above.

Figure 12:
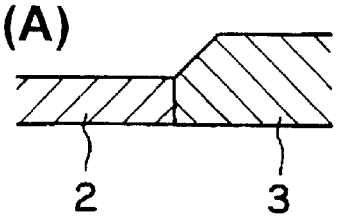
FIGS. 12(A)–(F) are sectional views showing abutment of flow paths constituting a split-flow passage of a split-flow-type flowmeter according to Example 11 of the present invention.
Figure 12:
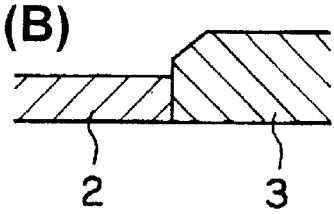
Figure 12:
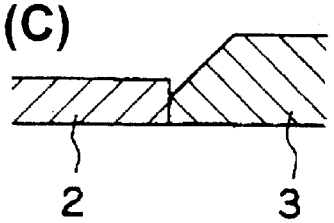
Figure 12:
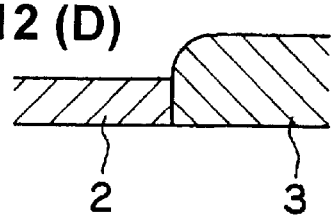
Figure 12:
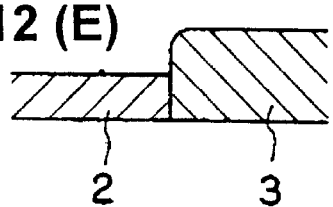
Figure 12:
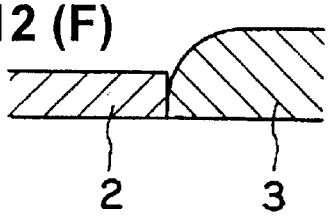

Referring to FIG. 12(A), an end portion of the inner wall of the flow path belonging to the detection unit 3 located in the vicinity of the above-mentioned plane of abutment is chamfered along a straight line. An end of the chamfer may be located above the inner wall surface of the flow path belonging to the introduction unit 2 as shown in FIG. 12(B) or below the inner wall surface of the flow path belonging to the introduction unit 2 as shown in FIG. 12(C). In the present invention, the angle of the chamfer is not limited to 45 degrees but may assume an arbitrary value.

Referring to FIG. 12(D), an end portion of the inner wall of the flow path belonging to the detection unit 3 located in the vicinity of the above-mentioned plane of abutment is chamfered along a curved line. An end of the chamfer may be located above the inner wall surface of the flow path belonging to the introduction unit 2 as shown in FIG. 12(E) or below the inner wall surface of the flow path belonging to the introduction unit 2 as shown in FIG. 12(F).

FIGS. 12(A)–(F) show a connection area connecting the introduction unit pipe wall 2 and the detecting introduction unit pipe wall 3 that forms a narrower flow passage than that formed by the introduction unit. At this connection area, an abrupt step is preferably eliminated, chamfered or rounded so that the regular flow and backflow are equally detected.

Figure 13:
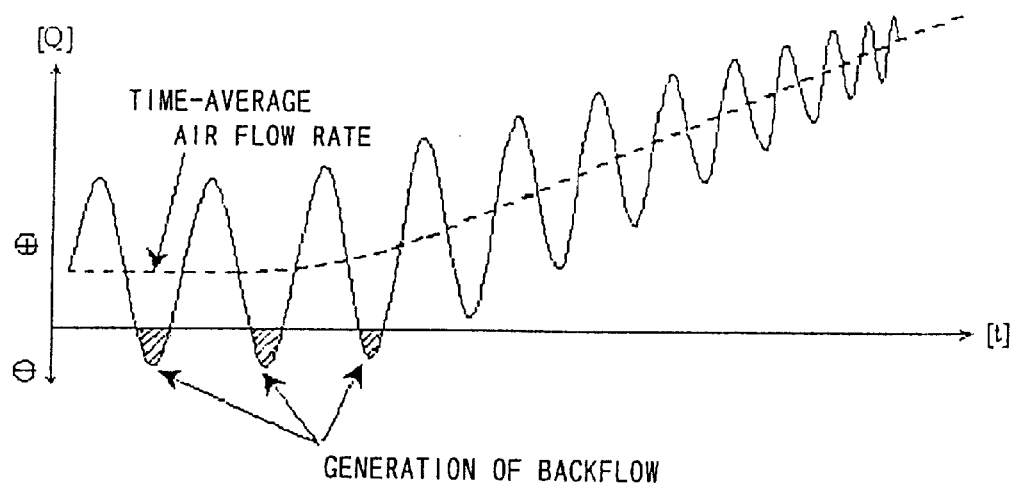
FIGS. 13(A) and (B) are graphs, sharing a common axis of time, for explaining variation in flow within an intake pipe with the rotational speed of an internal combustion engine, FIG. 13(A) showing variation in flow rate within the intake pipe, and FIG. 13(B) showing variation in rotational speed.
Figure 13:
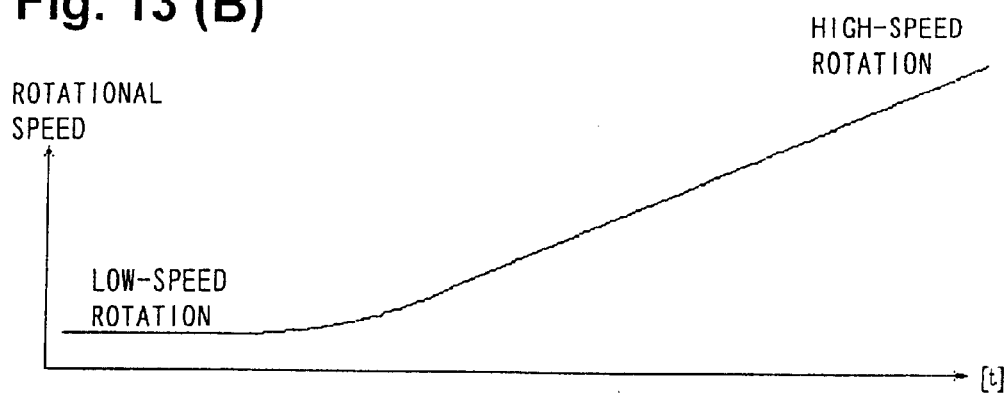
Figure 14:
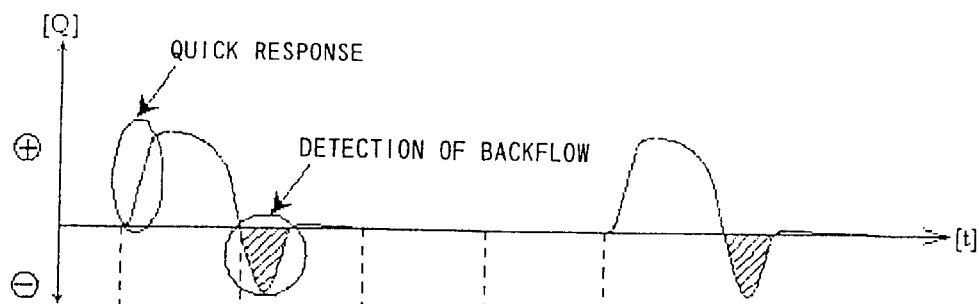
FIGS. 14(A) and (B) are graphs for explaining the relationship between strokes of a 4-cycle internal combustion engine and a detection output of a split-flow-type flowmeter used to measure a flow rate within an intake pipe of the internal combustion engine mounted on a vehicle, FIG. 14(A) showing the case of the present invention and FIG. 14(B) showing the case of Comparative Example.
Figure 14:
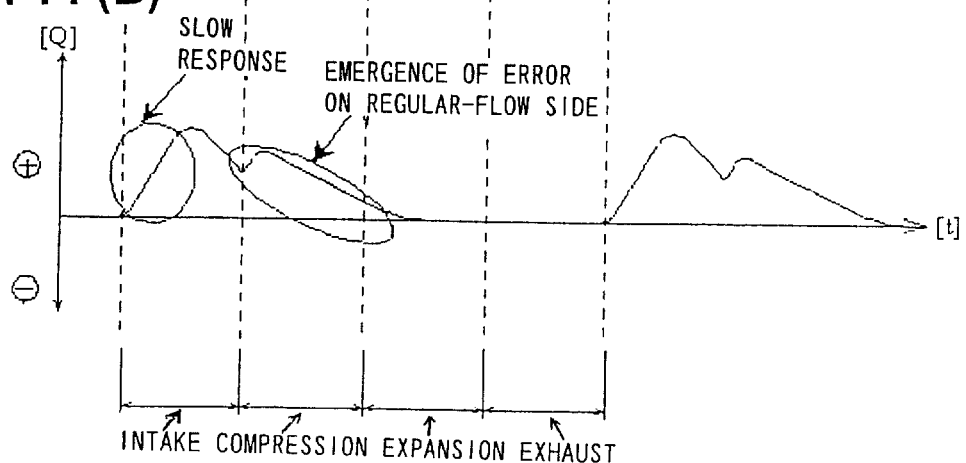
Figure 15:
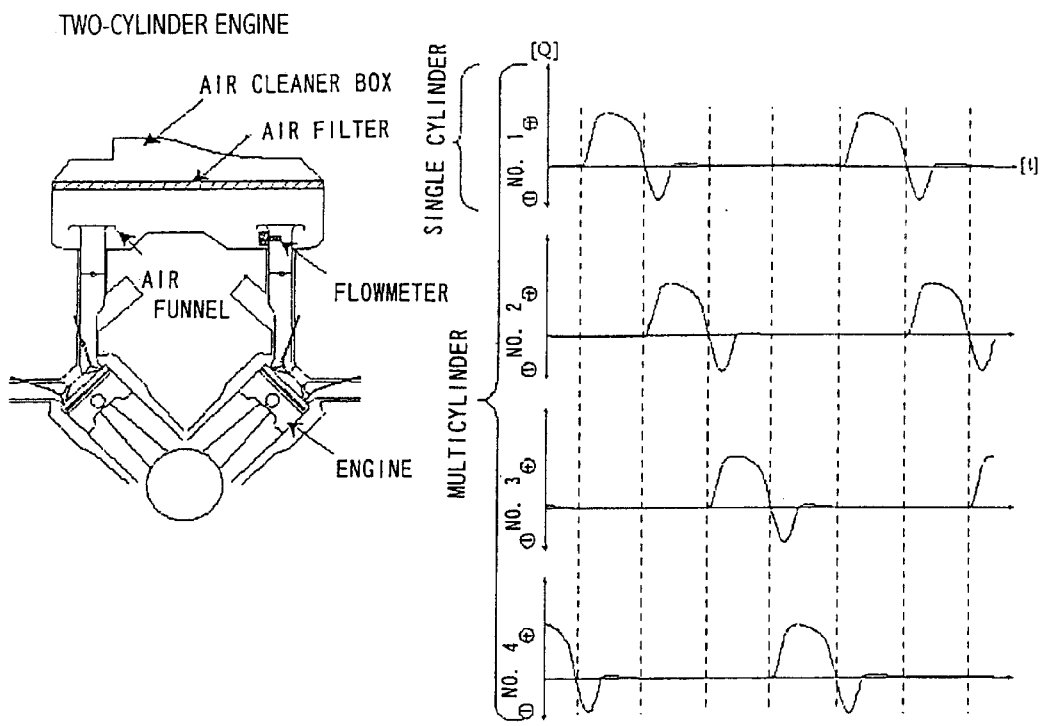
FIG. 15(A) is a view showing the structure of a two-cylinder engine and an intake system and graph for explaining variation in flow rate within an intake pipe with engine strokes.
FIG. 15(B): view showing the structure of a four-cylinder engine vehicle and an intake system and graph for explaining variation in flow rate within an intake pipe with engine strokes.
Figure 15:
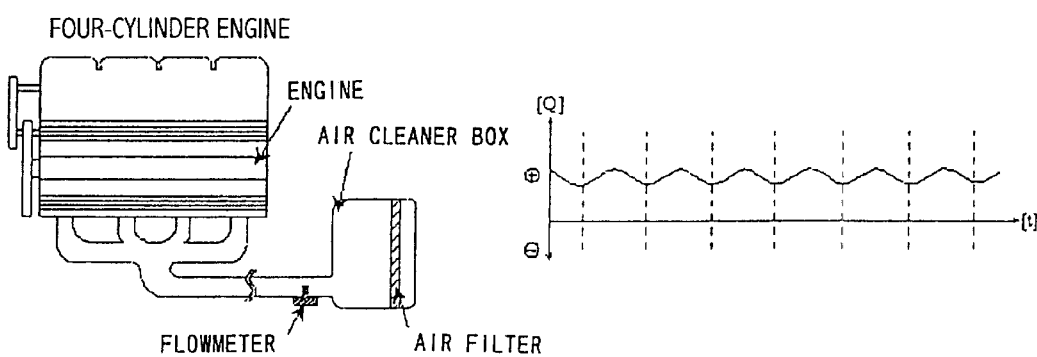

FIGS. 13–15 show various modes of pulsating flow rate (Q) appearing as a function of time (t) at the intake pipe of the internal combustion engine.

Particularly, FIG. 13(A) indicates a flow rate (Q) measured at the intake pipe that is fluctuating as a function of time (t), and a backflow rate is generally detected a low speed rotation of the engine. FIG. 13(B) shows the relationship between engine rotation speed and time.

FIG. 14(A) specifically shows that a flow rate detected at an intake pipe is positive in a regular flow direction when fuel gas is injected into an engine cylinder at a fuel intake operation. The flow rate becomes negative and a backflow is detected when the fuel gas is compressed in a quick response operation of a fuel gas intake/compression. FIG. 14(B) shows the flow rate detected in a slow response operation of fuel gas intake/compression, which flow rate does not become negative. The response becomes quicker and the backflow appears, as the flowmeter is placed closer to the engine cylinder as comparatively shown in FIGS. 15(A) and 15(B).

The present invention provides a split-flow-type flowmeter capable of measuring the flow rate of a pulsating flow with good response and measuring a regular-flow component and a backflow component equivalently. The present invention provides a construction of the split-flow-type flowmeter. Additionally, the present invention provides a split-flow-type flowmeter capable of readily positioning the flow inlet/flow outlet according to the diameter of the main-flow pipe and measuring a flow rate accurately.

It should further be apparent to those skilled in the art that various changes in form and detail of the invention as shown and described above may be made. It is intended that such changes be included within the spirit and scope of the claims appended hereto.

This application is based on Japanese Patent Application Nos. 2000-245073 filed Aug. 11, 2000 and 2000-263687 filed Aug. 31, 2000, the disclosures of which are incorporated herein by reference in their entirety.

What is claimed is:

1. A split-flow flowmeter for detecting a portion of flow diverted from a main-flow pipe into a split-flow passage, by use of a detection element facing the interior of the split-flow passage so as to measure a flow rate in the main-flow pipe, when a pulsating flow arises in the main-flow pipe, wherein:

the split-flow passage assumes a flow path structure that is symmetrical with respect to a plane passing through the detection element and being parallel to a flow cross section of the main-flow pipe;

a flow inlet and a flow outlet of the split-flow passage open in opposition to each other along a flow direction in the main-flow pipe and are symmetrically positioned with respect to the flow cross section of the main-flow pipe;

a center of opening of the flow inlet and the flow outlet of the split-flow passage is positioned between a center of the flow cross section of the main-flow pipe and an average-flow-velocity position at which flow in the main-flow pipe is of an average flow velocity, as observed on the flow cross section of the main-flow pipe, whereby a regular-flow component and a backflow component of the pulsating flow arising in the main-flow pipe can be measured equivalently.

2. The split-flow flowmeter as claimed in claim 1, wherein the center of opening of the flow inlet and the flow outlet of the split-flow passage is positioned within a radius 5D/16 from the center of the flow cross section of the main-flow pipe, where D is a diameter of the flow cross section of the main-flow pipe.

3. The split-flow flowmeter as claimed in claim 1, wherein L is not greater than D/2, where D is the diameter of the flow cross section of the main-flow pipe and L is a width of opening of the flow inlet and the flow outlet of the split-flow passage.

4. The split-flow flowmeter as claimed in claim 1, further comprising a bypass flow path, connecting the flow inlet to the flow outlet and bypassing the split-flow passage extending to the detection element.

5. The split-flow flowmeter as claimed in claim 1, wherein a portion of the split-flow passage decreases gradually in cross-sectional diameter from the flow inlet toward the detection element and from the flow outlet toward the detection element.

6. A split-flow flowmeter for detecting a portion of flow diverted from a main-flow pipe into a split-flow passage, by use of a detection element facing the interior of the split-flow passage so as to measure a flow rate in the main-flow pipe, and adapted for measuring a pulsating flow arising in the main-flow pipe, comprising an introduction unit inserted into the main-flow pipe and having a flow inlet for diverting therein a portion of flow from the main-flow pipe, a flow outlet for discharging the portion of flow, and a first flow path communicating with the flow inlet and the flow outlet and that is symmetrical with respect to a predetermined plane; and a detection unit having a second flow path that is symmetrical with respect to the predetermined plane and the detection element exposed to flow within the second flow path, wherein the introduction unit and the detection unit are integrally attached to the main-flow pipe;

the first flow path and the second flow path communicate with each other to thereby establish the split-flow passage; and the predetermined plane passes through the detection element and is parallel to a flow cross section of the main-flow pipe;

whereby a regular-flow component and a backflow component of the pulsating flow arising in the main-flow pipe can be measured equivalently.

7. The split-flow flowmeter as claimed in claim 6, wherein a center of opening of the flow inlet and the flow outlet is positioned within a radius 5D/16 from a center of the flow cross section of the main-flow pipe, where D is a diameter of the flow cross section of the main-flow pipe.

8. The split-flow flowmeter as claimed in claim 6, wherein a recess is formed in the detection unit so as to serve as the second flow path and the detection element is disposed at a bottom of the recess, and a partition for partitioning the first flow path is disposed within the introduction unit to thereby form the split-flow passage into a shape of a letter U.

9. The split-flow flowmeter as claimed in claim 6, wherein a U-shaped wall partitions the first flow path and is disposed within the introduction unit.

10. The split-flow flowmeter as claimed in-claim 6, further comprising a main-body unit having a cavity formed therein for a base portion of the introduction unit and the detection unit and on which a control circuit for controlling the detection element is mounted, wherein a portion of the main-body unit surrounding the cavity is fixed to the main-flow pipe.

11. The split-flow flowmeter as claimed in claim 10, wherein the main-body unit comprises a U-shaped wall that partitions the first flow path.

12. The split-flow flowmeter as claimed in claim 6, wherein the detection element is located outside an outer wall of the main-flow pipe.

13. The split-flow flowmeter as claimed in claim 6, wherein a width of the first flow path is wider than a width of the second flow path.

14. The split-flow flowmeter as claimed in claim 6, wherein an end portion of a surface of the detection unit defining the second flow path is chamfered in a straight line or in a curved line.

15. A split-flow flowmeter for detecting a portion of flow diverted from a main-flow pipe into a split-flow passage, by use of a detection element facing the interior of the split-flow passage so as to measure a flow rate in the main-flow pipe, comprising an introduction unit inserted into the main-flow pipe and having a flow inlet for diverting therein a portion of flow from the main-flow pipe and a first flow path communicating with the flow inlet; a detection unit having a second flow path and the detection element exposed to flow within the second flow path; and a main-body unit having a cavity formed therein for accommodating a base portion of said introduction unit and said detection unit and on which a control circuit for controlling the detection element is mounted, wherein said main-body unit accommodating the base portion of said introduction unit and said detection unit is attached to the main-flow pipe;

the first flow path and the second flow path communicate with each other via a remaining unoccupied portion of the cavity of said main-body unit to thereby establish the split-flow passage; and the split-flow passage is symmetrical with respect to a plane that passes through the detection element and is parallel to a flow cross section of the main-flow pipe.

16. A split-flow flow meter for detecting a portion of flow diverted from a main-flow pipe into a split-flow passage, by use of a detection element facing the interior of the split-flow passage so as to measure a flow rate in the main-flow pipe, comprising an introduction unit having a flow inlet and a first flow path communicating with the flow inlet; and a detection unit having a second flow path and the detection element within the second flow path; wherein the first and the second flow paths are connected to one another to thereby establish the split-flow passage that is symmetrical with respect to a plane passing through the detection element and is parallel to a flow cross section of the main-flow pipe.

17. The split-flow flowmeter as claimed in claim 1, wherein L is not greater than D/2 and is not smaller than D/16, where D is the diameter of the flow cross section of the main-flow pipe and L is a width of opening of the flow inlet and the flow outlet of the split flow passage.

18. The split-flow flowmeter as claimed in claim 1, wherein said split-flow passage is U-shaped.

* * * * *